US012610185B2

(12) United States Patent
Chiu et al.

(10) Patent No.: US 12,610,185 B2
(45) Date of Patent: Apr. 21, 2026

(54) CIRCUIT, METHOD FOR AUDIO SIGNAL PROCESSING WITH EXCURSION ESTIMATION COMPENSATION, AND NON-TRANSITORY STORAGE MEDIUM

(71) Applicant: ELITE SEMICONDUCTOR MICROELECTRONICS TECHNOLOGY INC., Hsinchu (TW)

(72) Inventors: Hsin-Yuan Chiu, Hsinchu (TW); Tsung-Fu Lin, Hsinchu (TW); Wun-Long Yu, Hsinchu (TW)

(73) Assignee: ELITE SEMICONDUCTOR MICROELECTRONICS TECHNOLOGY INC., Hsinchu (TW)

( * ) Notice: Subject to any disclaimer, the term of this patent is extended or adjusted under 35 U.S.C. 154(b) by 263 days.

(21) Appl. No.: 18/469,573

(22) Filed: Sep. 19, 2023

(65) Prior Publication Data

US 2025/0097637 A1 Mar. 20, 2025

(51) Int. Cl.

| | |
|---|---|
| ***H03G 11/00*** | (2006.01) |
| ***H04R 3/00*** | (2006.01) |
| ***H04R 3/04*** | (2006.01) |
| ***H04R 29/00*** | (2006.01) |

(52) U.S. Cl.

CPC ............... *H04R 3/007* (2013.01); *H04R 3/04* (2013.01); *H04R 29/001* (2013.01); *H04R 2430/01* (2013.01)

(58) Field of Classification Search

CPC ........ H04R 3/007; H04R 3/04; H04R 29/001; H04R 2430/01

USPC ...................................................... 381/55, 58

See application file for complete search history.

(56) References Cited

U.S. PATENT DOCUMENTS

| | | | | |
|---|---|---|---|---|
| 9,485,576 | B2 | 11/2016 | Gautama et al. | |
| 2013/0077795 | A1 | 3/2013 | Risbo et al. | |
| 2014/0161265 | A1* | 6/2014 | Chaikin | H04R 29/001 381/59 |
| 2019/0149920 | A1* | 5/2019 | Putzeys | H04R 3/06 381/55 |
| 2019/0305741 | A1* | 10/2019 | Yoneda | H04R 3/007 |
| 2022/0345838 | A1* | 10/2022 | French | H04R 3/02 |

FOREIGN PATENT DOCUMENTS

| | | | |
|---|---|---|---|
| CN | 106028235 | A | 10/2016 |

* cited by examiner

*Primary Examiner* — Ammar T Hamid

(57) ABSTRACT

Circuit, method for audio signal processing with excursion estimation compensation, and non-transitory storage medium are provided. The circuit comprises a delay circuit, compensation filter, excursion estimator, peak detector, gain determination circuit, and gain adjustment circuit. The delay circuit is for delaying a digital audio signal to output a delayed digital audio signal. The compensation filter is for generating a compensated digital audio signal according to the digital audio signal for excursion estimation compensation for a speaker type. The excursion estimator is for determining an estimated excursion signal for the speaker type according to the compensated digital audio signal. The gain determination circuit is for generating a gain setting signal according to the estimated excursion signal and a threshold value. The gain adjustment circuit is for generating an adjusted digital audio signal according to the gain setting signal and delayed digital audio signal.

19 Claims, 10 Drawing Sheets

CIRCUIT, METHOD FOR AUDIO SIGNAL PROCESSING WITH EXCURSION ESTIMATION COMPENSATION, AND NON-TRANSITORY STORAGE MEDIUM

BACKGROUND OF THE INVENTION

1. Field of the Invention

The present disclosure relates to circuits and methods for audio signal processing with speaker excursion protection, and in particular to circuits, methods for audio signal processing with excursion estimation compensation and non-transitory storage medium.

2. Description of the Related Art

Loudspeakers operate according to variations in electric current which causes variations in the magnetic field produced by an electromagnet. These variations cause the cone of the speaker to move. As a result, the cone movement creates pressure variation in the air and forms sound waves.

Excursion describes the distance it travels back and forth from its normal resting position. Over-excursion occurs when excursion limit of the diaphragm of a speaker is exceeded beyond its limits which can exhibit nonlinear damping, distorted sound in damage to the loudspeaker or a much shorter lifetime for the loudspeaker. Additionally, when over-excursion of a diaphragm occurs, the sound emitted by the speaker is distorted due to nonlinearity which can damage the speaker and voice-coil.

BRIEF SUMMARY OF THE INVENTION

An objective of the present disclosure is to provide circuits and methods for audio signal processing with speaker excursion protection, and in particular to circuits and methods for audio signal processing with excursion estimation compensation.

To achieve at least the above objective, the present disclosure provides a circuit for audio signal processing with excursion estimation compensation. The circuit comprises a delay circuit, a compensation filter, an excursion estimator, a gain determination circuit, and a gain adjustment circuit. The delay circuit is for delaying a digital audio signal to output a delayed digital audio signal. The compensation filter is for generating a compensated digital audio signal according to the digital audio signal for excursion estimation compensation for a speaker type. The excursion estimator is for determining an estimated excursion signal for the speaker type according to the compensated digital audio signal. The gain determination circuit is for generating a gain setting signal according to the estimated excursion signal and a threshold value. The gain adjustment circuit is for generating an adjusted digital audio signal according to the gain setting signal and the delayed digital audio signal.

To achieve at least the above objective, the present disclosure provides a method for audio signal processing with excursion estimation compensation. The method comprises the following steps. A digital audio signal is delayed to output a delayed digital audio signal. A compensated digital audio signal is generated by a compensation filter according to the digital audio signal for excursion estimation compensation for a speaker type. An estimated excursion signal for the speaker type is determined according to the compensated digital audio signal. A gain setting signal is generated according to the estimated excursion signal and a threshold value. An adjusted digital audio signal is generated according to the gain setting signal and the delayed digital audio signal.

In some embodiments of the circuit or the method, the compensation filter has a filter response for excursion estimation compensation for the speaker type and is configured to generate the compensated digital audio signal according to the digital audio signal and the filter response.

In some embodiments of the circuit or the method, the filter response of the compensation filter is associated with a specific frequency band for excursion estimation compensation for the speaker type and the compensation filter is capable of amplifying components of the digital audio signal with respect to the specific frequency band to generate the compensated digital audio signal.

In some embodiments of the circuit or the method, the filter response of the compensation filter is associated with a specific frequency band in which a speaker of the speaker type is operable to have a maximum excursion.

In some embodiments of the circuit or the method, the compensation filter is capable of amplifying components of the digital audio signal with respect to the specific frequency band to generate the compensated digital audio signal according to the digital audio signal and the filter response.

In some embodiments of the circuit or the method, the compensation filter is based on an infinite impulse response (IIR) filter, or a finite impulse response (FIR) filter.

In some embodiments of the circuit or the method, the compensation filter is based on a shelving filter for excursion estimation compensation for a speaker type having a shelving response.

In some embodiments of the circuit or the method, the compensation filter is based on a peaking filter for excursion estimation compensation for a speaker type having a peaking response.

In some embodiments of the circuit, the gain determination circuit comprises a peak detector and a gain calculation circuit. The peak detector is for outputting a peak indication excursion signal according to the estimated excursion signal. The gain calculation circuit is for generating the gain setting signal according to the peak indication excursion signal and the threshold value.

In some embodiments of the method, generating the gain setting signal according to the estimated excursion signal and a threshold value comprises: outputting a peak indication excursion signal according to the estimated excursion signal; and generating the gain setting signal according to the peak indication excursion signal.

DETAILED DESCRIPTION OF THE INVENTION

To facilitate understanding of the object, characteristics and effects of this present disclosure, embodiments together with the attached drawings for the detailed description of the present disclosure are provided.

Figure 1:
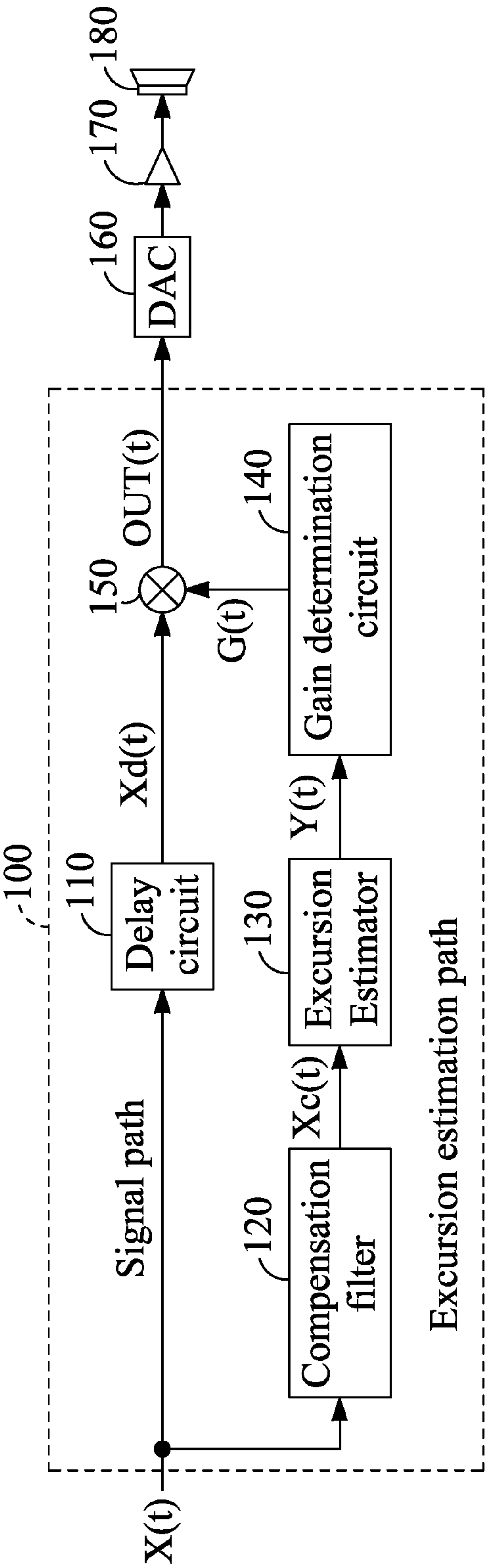
FIG. 1 is a schematic diagram illustrating architecture for a circuit for audio signal processing with excursion estimation compensation according to an embodiment of the present disclosure.

FIG. 1 illustrates architecture for a circuit for audio signal processing with excursion estimation compensation according to an embodiment of the present disclosure. As shown in FIG. 1, in order to reproduce audio according to a digital audio signal (denoted by X(t)) by using a speaker 180, a circuit 100 for audio signal processing with excursion estimation compensation can be employed to output an adjusted digital audio signal (denoted by OUT(t)) according to a digital audio signal (denoted by X(t)). The circuit 100 is capable of performing audio signal processing for over-excursion protection with excursion estimation compensation for the speaker 180. The circuit 100 can be disposed or combined in an electronic device having computing or digital audio signal or data processing functionality for facilitating audio reproduction, such as mobile phones, tablet computers, notebook computers, desktop computers, multimedia players, digital audio players, or portable wireless or wired speakers. For practical applications, additional circuitry or audio signal processing devices such as a digital-to-analog converter 160 for converting the adjusted digital audio signal OUT(t) into an analog signal and an amplifier 170 for driving the speaker 180 according to the analog signal, as exemplified in FIG. 1, can be coupled electrically between the circuit 100 and the speaker 180 for audio reproduction.

The circuit 100 comprises a delay circuit 110, a compensation filter 120, an excursion estimator 130, a gain determination circuit 140, and a gain adjustment circuit 150. From another aspect, the circuit 100 can be regarded as including a signal path and an excursion estimation path. The signal path includes the delay circuit 110 and gain adjustment circuit 150 from an input terminal to an output terminal of the circuit 100. The excursion estimation path includes the compensation filter 120, excursion estimator 130, and gain determination circuit 140 between the input terminal and gain adjustment circuit 150.

In the signal path, the delay circuit 110 is for delaying the digital audio signal X(t) to output a delayed digital audio signal Xd(t). Since the audio signal processing in the estimated excursion path requires a processing time, the delay circuit 110 can be configured to delay the digital audio signal X(t) with a delay time in line with the processing time so that the gain adjustment circuit 150 can generate an adjusted digital audio signal OUT(t) according to the delayed digital audio signal Xd(t) and a gain setting signal G(t) from the estimated excursion path.

In the estimated excursion path, the compensation filter 120 is for generating a compensated digital audio signal (denoted by Xc(t)) according to the digital audio signal X(t) for excursion estimation compensation for the speaker 180. The compensation filter 120 can be implemented to generate the compensated digital audio signal Xc(t) with respect to a type of speaker (or referred to as a speaker type) to which the speaker 180 belongs so as to compensate for asymmetry excursion of the speaker 180 correspondingly. The excursion estimator 130 is for determining an estimated excursion signal Y(t) for the speaker 180 according to the compensated digital audio signal Xc(t). The excursion estimator 130 can be implemented to use an excursion response for the speaker 180 to determine the estimated excursion signal Y(t), which represents estimated loudspeaker excursion being variable according to the compensated digital audio signal. The gain determination circuit 140 is for generating a gain setting signal G(t) according to the estimated excursion signal Y(t) and a threshold value. The gain determination circuit 140 can be realized to determine whether the estimated excursion signal Y(t) satisfies a criterion based on the threshold value. For example, if the estimated excursion signal Y(t) satisfies the criterion, such as whether the estimated excursion signal Y(t) is greater than the threshold value, such as a predetermined excursion threshold value or a maximum excursion limit allowable for the speaker 180, then the gain determination circuit 140 generates the gain setting signal G(t) having a reduced gain value to prevent over-excursion of the speaker 180.

The gain adjustment circuit 150 is for generating an adjusted digital audio signal OUT(t) according to the delayed digital audio signal Xd(t) and the gain setting signal G(t). For example, the adjusted digital audio signal OUT(t) can be generated based on the gain setting signal G(t) and the delayed digital audio signal Xd(t), such as expressed by an equation $OUT(t)=G(t)\cdot Xd(t)$. The gain adjustment circuit 150 can be implemented by using an amplifier, a multiplier, or a mixer, or any appropriate circuit.

As will be exemplified below, the circuit 100 can be implemented to perform audio signal processing for over-excursion protection with excursion estimation compensation for a specific speaker type, for example, with a specific type of characteristic, such as excursion responses.

Figure 2A:
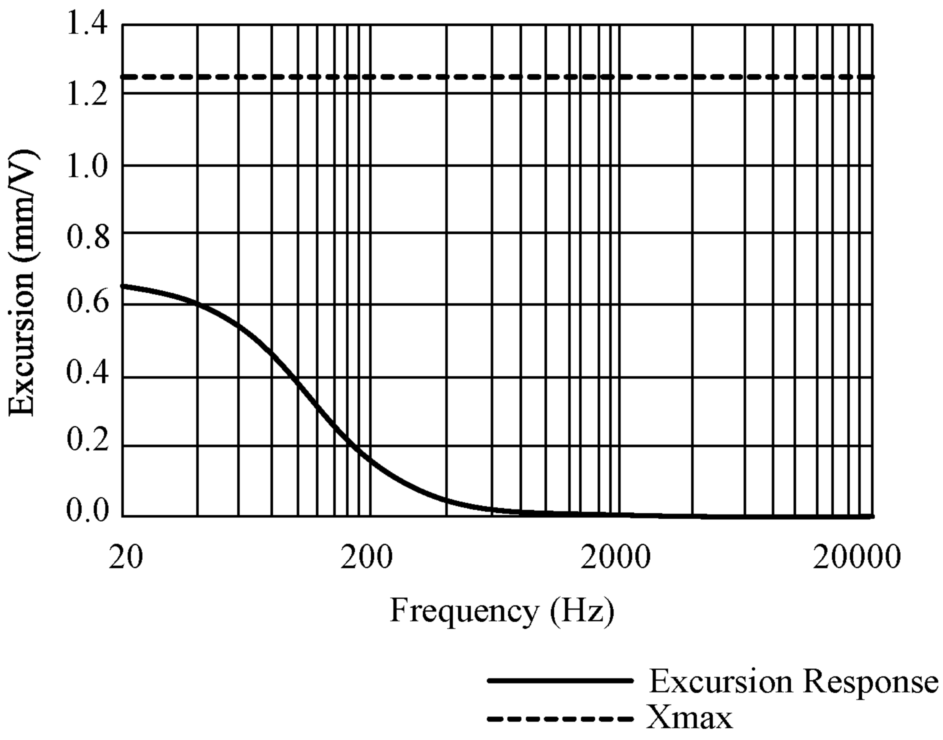
FIG. 2A is a diagram illustrating an example of excursion response for a first type of speakers.

For example, the speaker 180 may be of a first type of speakers. FIG. 2A illustrates an example of excursion response for the first type of speakers. As illustrated in FIG.

2A, the example of excursion response, represented by a solid curve, for the first type of speakers indicate a low shelving response, where a dashed horizontal line indicates an exemplary excursion threshold (or maximum displacement) (denoted by Xmax) for a speaker of the first type. The first type of speakers can be various low-frequency speakers, such as woofers or subwoofers.

Figure 3A:
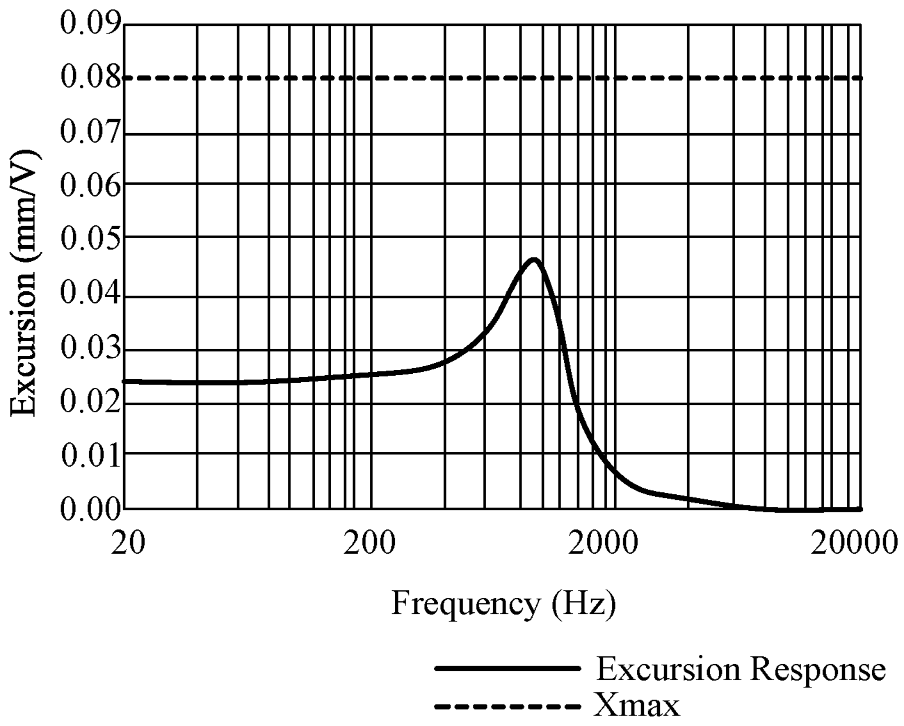
FIG. 3A is a diagram illustrating an example of excursion response for a second type of speakers.

In another example, the speaker 180 may be of a second type of speakers. FIG. 3A illustrates an example of excursion response for the second type of speakers. As illustrated in FIG. 3A, the example of excursion response, represented by a solid curve, for the second type of speakers indicate a peaking response, where a dashed horizontal line indicates an exemplary excursion threshold (or maximum displacement) (denoted by Xmax) for a speaker of the second type. The second type of speakers can be various mid-range frequency speakers.

In some embodiments, the compensation filter 120 has a filter response for excursion estimation compensation for a specific type of the speaker 180 and is configured to generate the compensated digital audio signal Xc(t) according to the digital audio signal X(t) and the filter response. In some embodiments, the compensation filter 120 is based on an infinite impulse response (IIR) filter, or a finite impulse response (FIR) filter.

Figure 2B:
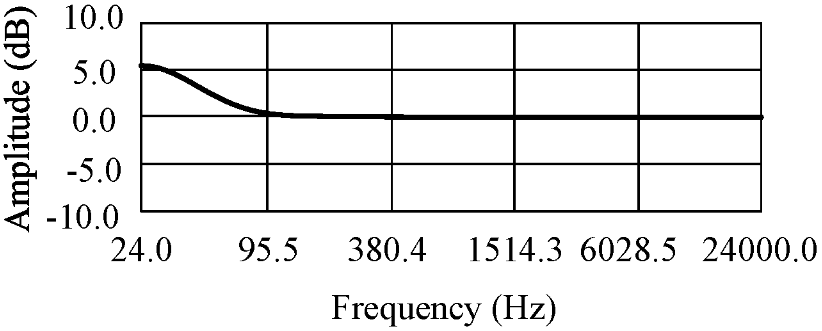
FIG. 2B is a diagram illustrating an example of a filter response which a compensation filter of the circuit shown in FIG. 1 can be configured to implement for excursion estimation compensation for the first type of speakers exemplified in FIG. 2A, according to an embodiment of the present invention.

For example, the compensation filter 120 can be implemented based on a filter response of a low shelving filter, as illustrated in FIG. 2B, when the speaker 180 is of the first speaker type and has an excursion response which is a shelving response as exemplified in FIG. 2A.

Figure 3B:
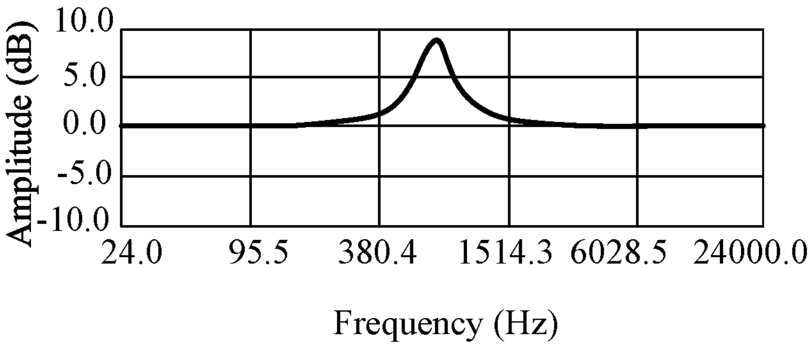
FIG. 3B is a diagram illustrating another example of a filter response which a compensation filter of the circuit shown in FIG. 1 can be configured to implement for excursion estimation compensation for the second type of speakers exemplified in FIG. 3A, according to an embodiment of the present invention.

In another example, the compensation filter 120 can be implemented based on a filter response of a peaking filter, as illustrated in FIG. 3B, when the speaker 180 is of the second speaker type and has an excursion response which is a peaking response as exemplified in FIG. 3A.

In some embodiments, the filter response of the compensation filter 120 is associated with a specific frequency band for excursion estimation compensation for a specific type of the speaker 180 and the compensation filter 120 is capable of amplifying components of the digital audio signal X(t) with respect to the specific frequency band to generate the compensated digital audio signal Xc(t).

In addition, the filter response of the compensation filter 120 is associated with a specific frequency band in which the speaker 180 is operable to have a maximum excursion.

For example, when the speaker 180 is of the first speaker type and has a shelving response as in FIG. 2A and the compensation filter 120 is implemented based on a filter response of a low shelving filter as in FIG. 2B, the compensation filter 120 is associated with a specific frequency band of frequencies lower than a frequency value (such as 30, 40, or 50 Hz) for excursion estimation compensation for the speaker 180, amplifying components of the digital audio signal X(t) with respect to the specific frequency band to generate the compensated digital audio signal Xc(t). As shown in FIG. 2A, in the above specific frequency band, the speaker 180 is operable to have a maximum excursion.

In another example, when the speaker 180 is of the second speaker type and has a peaking response as in FIG. 3A and the compensation filter 120 is implemented based on a filter response of a peaking filter as in FIG. 3B, the compensation filter 120 is associated with a specific frequency band of frequencies from a first frequency value to a second frequency value (such as from 400 Hz to 1400 Hz) for excursion estimation compensation for the speaker 180, amplifying components of the digital audio signal X(t) with respect to the specific frequency band to generate the compensated digital audio signal Xc(t). As shown in FIG. 3A, in the above specific frequency band, the speaker 180 is operable to have a maximum excursion.

Accordingly, the compensation filter 120 is capable of amplifying components of the digital audio signal X(t) with respect to a specific frequency band to generate the compensated digital audio signal Xc(t) according to the digital audio signal X(t) and the filter response.

Figure 4:
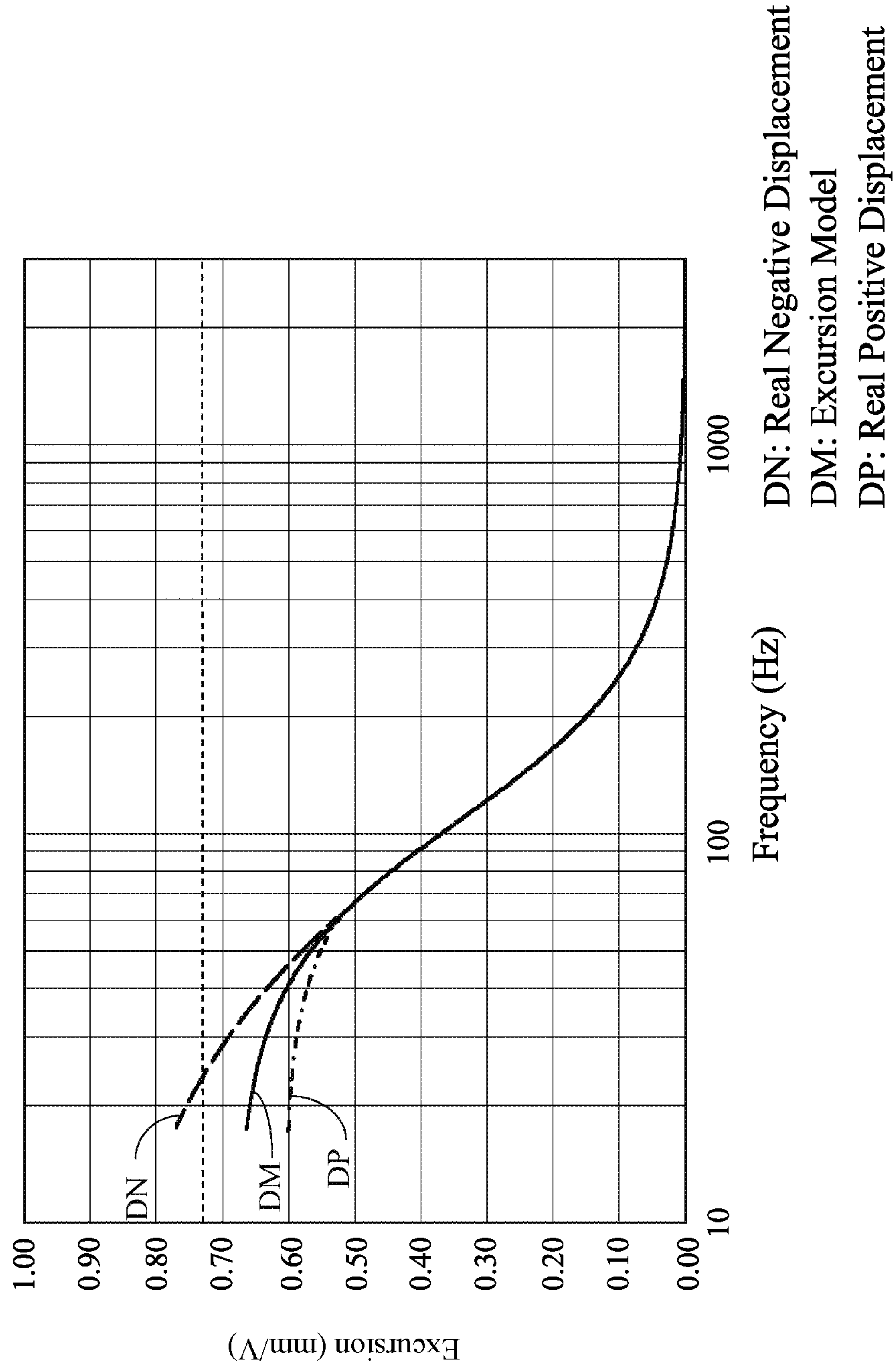
FIG. 4 is a diagram illustrating examples of real negative displacement (DN), excursion model (DM), and real positive displacement (DP) for a speaker of the first type.

The following provides examples for illustrating how the architecture of the circuit 100 addresses an issue of over-excursion due to asymmetry excursion nonlinearity by using excursion estimation compensation. FIG. 4 illustrates examples of real negative displacement (DN), excursion model (DM), and real positive displacement (DP) for a speaker of the first type, for example, having an excursion response of a shelving response. In FIG. 4, a solid curve DM indicates the excursion response of the speaker.

In theory, the excursion response can be obtained according to excursion modeling based on speaker parameters, including force factor (Bl), mechanical damping factor (Rms), mechanical mass (Mms), mechanical compliance (Cms), and DC resistance (RE), in a symmetrical manner and regardless of asymmetrical nonlinearity, such as variation of force factor with respect to displacement, as in conventional approaches. The excursion response obtained in this manner is generally in form of a transfer function of loudspeaker excursion or displacement (unit as mm/V) with respect to frequency. Thus, the excursion estimator 130 can be implemented according to an excursion response obtained based on the excursion modeling.

However, in practical applications, the speaker 180 can be observed to produce real positive excursions and real negative excursions in an asymmetrical manner in a frequency band (e.g., frequencies lower than a frequency value such as 60 Hz) in which the maximum excursion may occur, in particular. As shown in FIG. 4, a dashed curve DN and a dot-dashed curve DP indicate real negative excursions and real positive excursions of the speaker 180, respectively, which are obtained by measurement, wherein it is assumed that the maximum withstand excursion of the speaker 180, in the present example, is about 0.72 mm, as indicated by a horizontal dotted line. As can be observed from FIG. 4, it is noted that at a frequency of 20 Hz, the real negative excursion (e.g., indicated by the dashed curve DN) is over the maximum withstand excursion (e.g., 0.72 mm) although the estimated excursion obtained according to the excursion response (e.g., indicated by the solid curve DM) is under the maximum withstand excursion (e.g., 0.72 mm). Accordingly, in a supposition that there is no excursion estimation compensation provided by the compensation filter 120 in the excursion estimation path, the excursion estimator 130 implemented according to an excursion response obtained based on the excursion modeling may produce erroneous estimations. In worse cases, over-excursion may still occur though the gain determination circuit 140 is configured to generate a gain setting signal with a reduced gain value especially during the specific frequency band in which the speaker 180 may operate produce the maximum excursion, because of the estimated excursion in error, thereby causing damage to the speaker 180.

From the examples of FIG. 4, the inventor of the present disclosure contemplates the application scenarios as illustrated above regarding asymmetry excursion and thus introduces excursion estimation compensation by using a compensation filter 120 in the excursion estimation path, as illustrated in FIG. 1. Following this, the compensation filter 120 can be implemented based on a filter response of a low shelving filter, as illustrated FIG. 2B. In this manner, referring to FIGS. 2B and 4, the filter response can be configured to have a specific frequency band (e.g., frequencies lower than a frequency value such as 60 Hz) associated with the shelving response of the speaker 180 of the first type. Accordingly, the compensation filter 120 is capable of amplifying components of the digital audio signal X(t) with respect to a specific frequency band to generate the compensated digital audio signal Xc(t) according to the digital audio signal X(t) and the filter response. Thus, the excursion estimator 130, with the support of the compensation filter 120, is capable of determining an estimated excursion signal Y(t) for the speaker 180 according to the compensated digital audio signal Xc(t), without underestimation of the excursion, even in the specific frequency band, e.g., at a frequency of 20 Hz.

Further, in implementation, for example, the excursion estimator 130 can utilize an impulse response (e.g., denoted by H(t)) in time domain derived from the excursion response of the speaker 180 (e.g., denoted by H(s)) in frequency domain in order to determine an estimated excursion signal Y(t) for the speaker 180 according to the compensated digital audio signal Xc(t). The impulse response may include a series of impulse response coefficients. The estimated excursion signal Y(t) can be determined by convolution of the compensated digital audio signal Xc(t) and impulse response of the speaker 180, for example, as expressed by an equation: $Y(t)=Xc(t)*H(t)$.

Figure 5A:
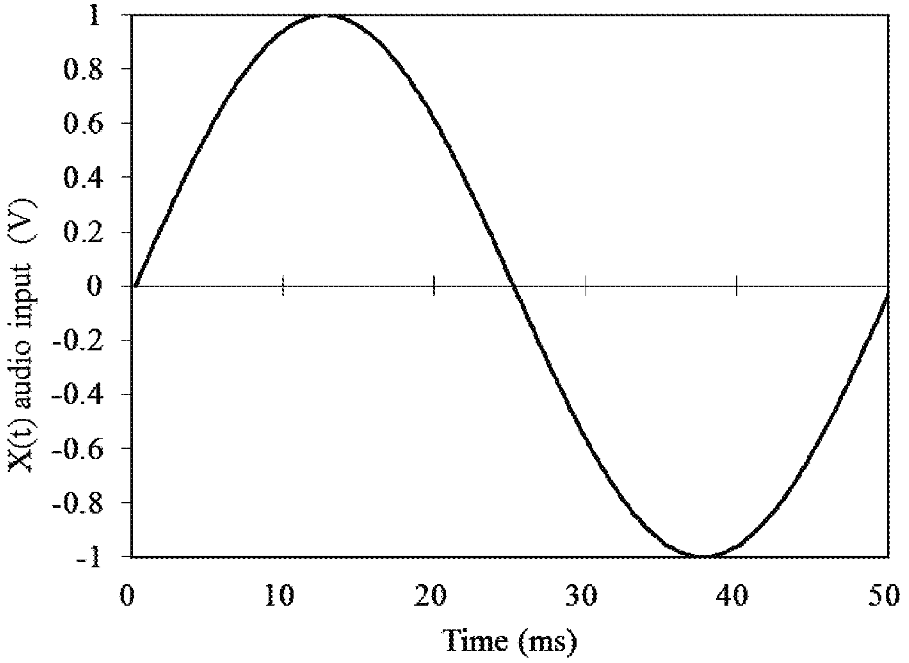
FIG. 5A is a diagram illustrating an example of an audio waveform.
Figure 5B:
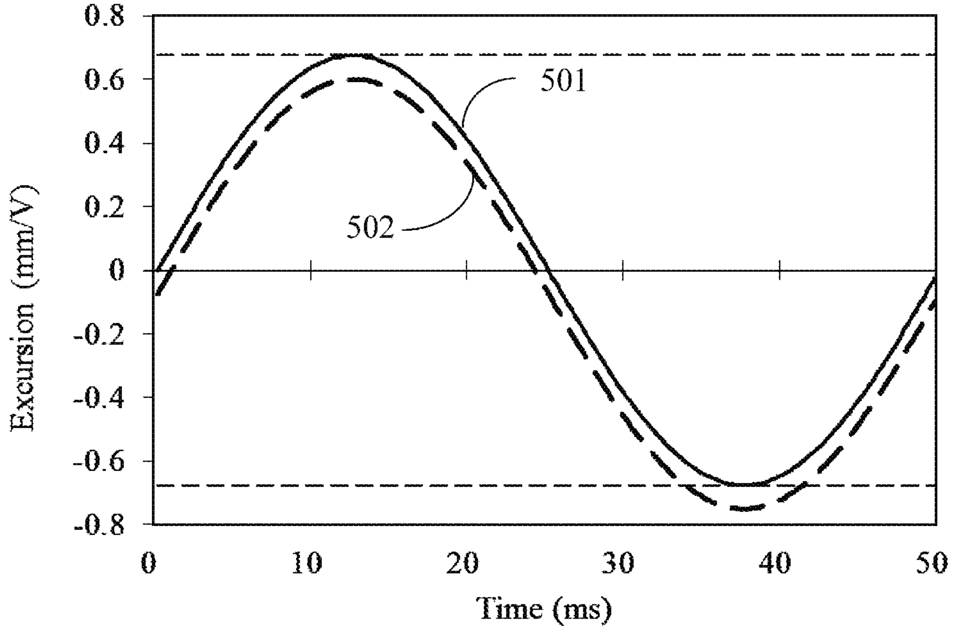
FIG. 5B is a diagram illustrating examples of estimated displacement according to an excursion response and actual displacement by measurement, in response to the audio waveform shown in FIG. 5A, without excursion estimation compensation.
Figure 5C:
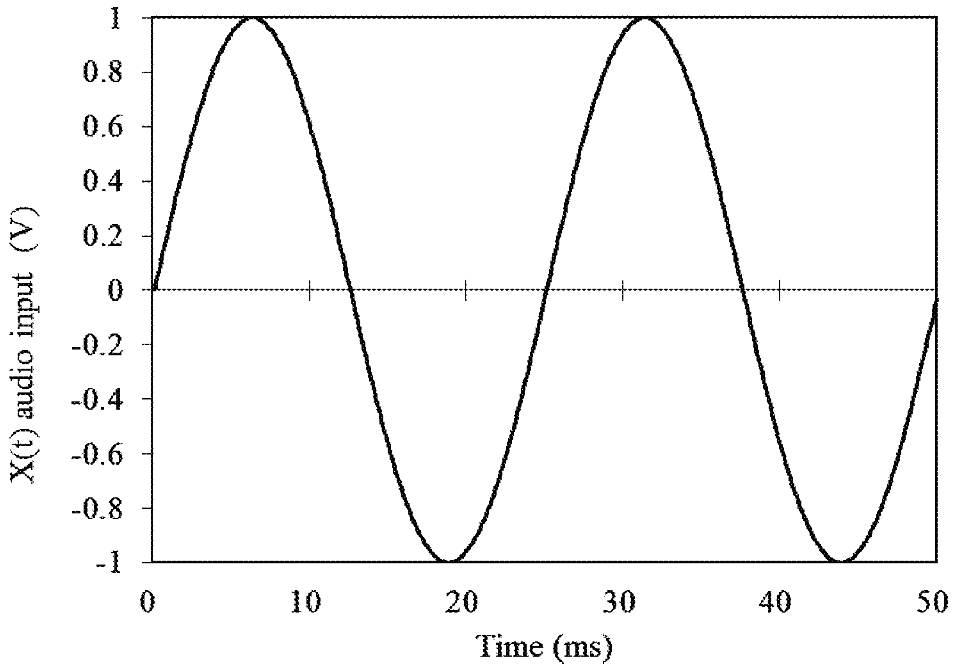
FIG. 5C is a diagram illustrating an example of an audio waveform at a second frequency.
Figure 5D:
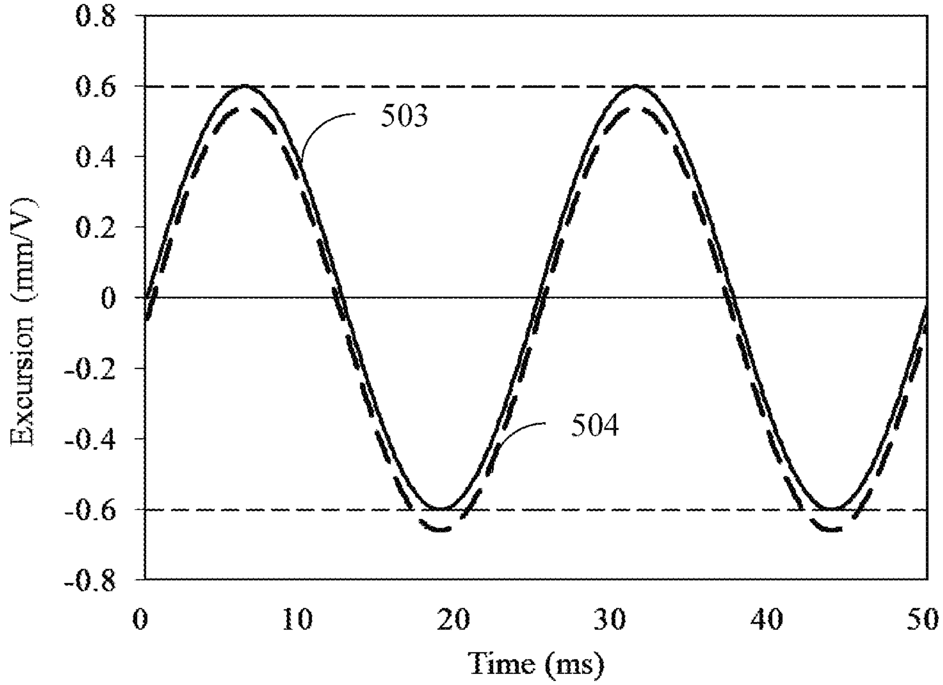
FIG. 5D is a diagram illustrating examples of estimated displacement according to an excursion response and actual displacement by measurement, in response to the audio waveform shown in FIG. 5C, without excursion estimation compensation.

The following examples demonstrate the impacts of asymmetrical excursion on excursion estimation in time domain. FIG. 5A illustrates an example of an audio waveform (e.g., a sinusoidal signal) at a first frequency (e.g., 20 Hz). FIG. 5B illustrates examples of estimated displacement (e.g., as indicated by a curve 501) according to an excursion response of a speaker and actual displacement (e.g., as indicated by a dashed curve 502) by measurement of the speaker, in response to the audio waveform shown in FIG. 5A, without excursion estimation compensation derived from an input signal of FIG. 5A. In FIGS. 5A and 5B, at a frequency of 20 Hz, an audio signal with an amplitude of 1 V is associated with (or corresponds to) an estimated excursion (e.g., vibration of loudspeaker) of an amplitude of 0.675 mm. For example, the speaker has an excursion threshold (Xmax) of 0.675 mm. In FIG. 5B, the actual excursion exhibits an offset which can be determined by comparison of the actual and ideal amplitudes for the lower half cycle of displacement. The offset is calculated as: $\text{offset}=|-0.75|-|-0.675|=0.075$ mm. The offset in dB is calculated as: offset in $\text{dB}=20*\log(|-0.75|/|-0.675|)=+0.915$ dB. FIG. 5C illustrates an example of an audio waveform at a second frequency (e.g., 40 Hz). FIG. 5D illustrates examples of estimated displacement (e.g., as indicated by a curve 503) according to an excursion response of a speaker and actual displacement (e.g., as indicated by a dashed curve 504) by measurement of the speaker, in response to the audio waveform shown in FIG. 5C, without excursion estimation compensation derived from an input signal of FIG. 5C.

In some embodiment of the circuit 100, the gain determination circuit 140 can be realized to determine whether the estimated excursion signal Y(t) is greater than or equal to a threshold value, such as a predetermined excursion threshold value or a maximum excursion limit for the speaker 180 and to generate a gain setting signal G(t) having a reduced gain value according to the results of the determination so as to prevent over-excursion of the speaker 180. If the estimated excursion signal Y(t) (e.g., its magnitude or its absolute value) is greater than the threshold value, the gain determination circuit 140 outputs the gain setting signal G(t) with a reduced gain value (e.g., a value less than 1 or 0 dB) to reduce the delayed digital audio signal Xd(t). If the estimated excursion signal Y(t) (e.g., its magnitude or its absolute value) is less than or equal to the threshold value, the gain determination circuit 140 outputs the gain setting signal G(t) with a gain value (e.g., a value of 1 or 0 dB) which indicates the delayed digital audio signal Xd(t) will not be modified.

For example, using a shelving filter as the compensation filter 120, when the frequency (e.g., denoted by Fin) of a component of the digital audio signal X(t) is less than or equal to a specific frequency value (e.g., 60 Hz), the gain determination circuit 140 outputs a gain value so as to prevent excursion (or coil displacement) of the speaker 180 over the threshold value.

By using the compensation filter 120, when Fin<60 Hz, the example of estimated excursion with an amplitude equal to the excursion threshold (Xmax) 0.675 (mm) will be compensated (e.g., amplified in this case when Fin<60 Hz) to a compensated predicted excursion with an amplitude of 0.75 (mm/V).

The gain determination circuit 140 determines a gain value (e.g., denoted by Gv) to make the compensated predicted excursion (amplitude: 0.75 (mm/V)) become under the excursion threshold (e.g., an amplitude of 0.675 (mm)). For example, according to an equation indicating an output excursion amplitude (OUT_E) is equal to an input excursion amplitude (IN_E) multiplied by the gain value (Gv), i.e., $OUT\_E=IN\_E*Gv$, the gain value Gv is equal to $0.675/0.75=0.9$ or $20*\log(0.9/1)=-0.915$ dB. Accordingly, the gain setting signal G(t) can be determined according to the gain value Gv.

By calculation, it can be seen how this gain value serves to resolve the asymmetrical excursion distortion issue. Because the actual excursion should be within an amplitude of 0.675 (mm/V), the delayed digital audio signal Xd(t) multiplied by the gain value Gv (e.g., 0.9) corresponds to a displacement with an amplitude of 0.6075 (mm/V) ideally. Then, the actual negative cycle of the displacement will be −0.675 (mm/V), without exceeding a (negative) excursion threshold (i.e., −Xmax) even though asymmetry excursion of the speaker occurs under 50 Hz.

In an embodiment for another type of speakers (e.g., the second type as exemplified in FIG. 3A) with an excursion response based on a peaking response, a peaking filter is used as a compensation filter, and the circuit 100 with the compensation filter 120 and the gain determination circuit 140 can be configured to find a gain value Gv similarly with appropriate criteria, for example, when frequencies lying within a specific frequency band from a first frequency to a second frequency (such as from 400 Hz to 1400 Hz) for excursion estimation compensation for the speaker 180. In further embodiments, the circuit 100 can be configured or implemented to perform audio signal processing with excursion estimation compensation for other types of speakers (such as a speaker having an excursion response based on a combination of those of the first type and the second type, or so on) by combining the above examples for excursion estimation compensation for the first and second types of speakers whenever appropriate.

Figure 6:
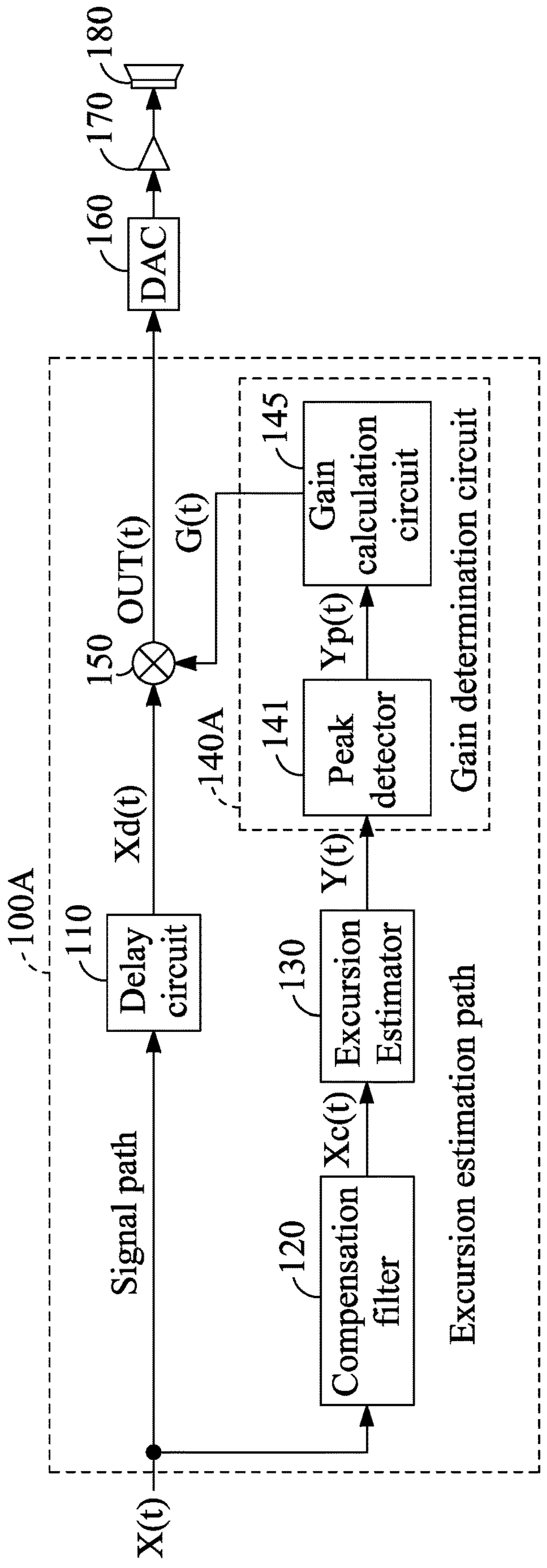
FIG. 6 is a schematic diagram illustrating an embodiment of a circuit for audio signal processing with excursion estimation compensation based on the architecture shown in FIG. 1.

Further, in some embodiments, the gain determination circuit in FIG. 1 can be implemented by using dynamic range control and peak and hold time control. FIG. 6 illustrates an embodiment of a circuit 100A for audio signal processing with excursion estimation compensation based on the architecture of FIG. 1. In FIG. 6, as compared with the circuit 100, the circuit 100A for audio signal processing with excursion estimation has its gain determination circuit 140A including a peak detector 141 and a gain calculation circuit 145. The peak detector 141 is for outputting a peak indication excursion signal (e.g., denoted by Yp(t)) according to the estimated excursion signal Y(t). The gain calculation circuit 145 is for generating the gain setting signal G(t) according to the peak indication excursion signal Yp(t) and the threshold value, such as excursion threshold value or a maximum excursion limit.

Figure 7:
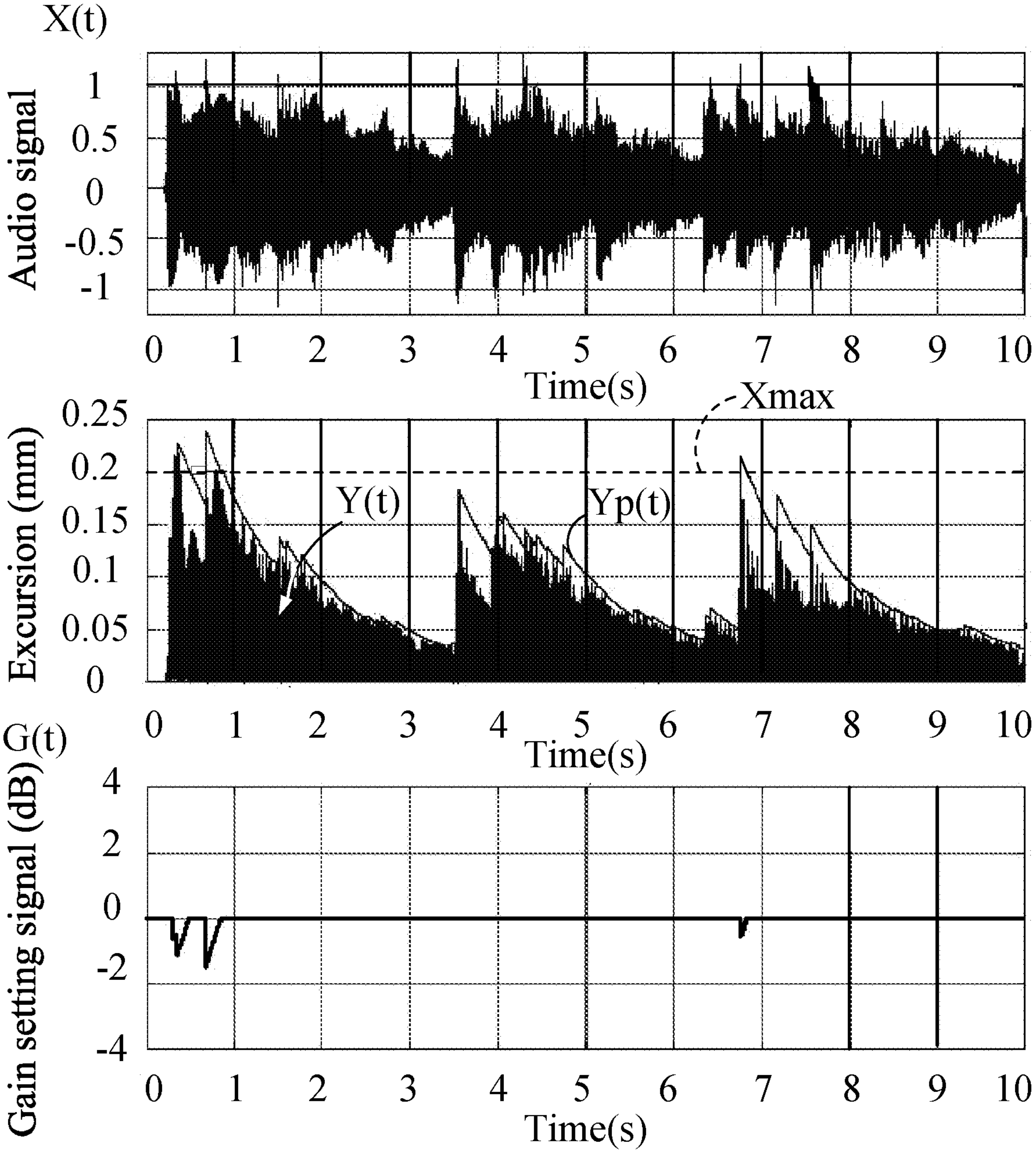
FIG. 7 is a diagram illustrating an example for peak detection and gain calculation.

FIG. 7 illustrates an example of peak detection and gain calculation. In the upper portion of FIG. 7, the digital audio signal X(t) is shown in a form of waveform for the sake of illustration. In the middle portion of FIG. 7, the estimated excursion signal Y(t) (mm/V) (e.g., an absolute value of excursion) with excursion estimation compensation, which is associated with the digital audio signal X(t), is shown along with the peak indication excursion signal Yp(t), wherein a horizontal line indicates a threshold value, for example, an excursion threshold (Xmax) for a speaker. The peak indication excursion signal Yp(t), for example, can be obtained according to a peak detection approach or an averaging process according to the estimated excursion signal Y(t). For example, a peak detection approach retains a maximum value of the estimated excursion recorded during a time window over time; or another peak detection approach obtains an envelope of the estimated excursion by averaging over a time window over time. In the lower portion of FIG. 7, the gain setting signal G(t) is shown indicating the gain value for adjusting the associated digital audio signal X(t) (actually, the delayed digital audio signal Xd(t)). For example, when the peak indication excursion signal Yp(t) exceeds the excursion threshold Xmax (e.g., 0.2 mm), the gain setting signal G(t) has an associated gain value with a negative value in dB (or a value less than 1), for example, by using an equation of G(t)=Xmax/Yp(t). When the peak indication excursion signal Yp(t) is under or less than the excursion threshold Xmax (e.g., 0.2 mm), the gain setting signal G(t) has an associated gain value of 0 dB (or a value equal to 1), for example.

Figure 8:
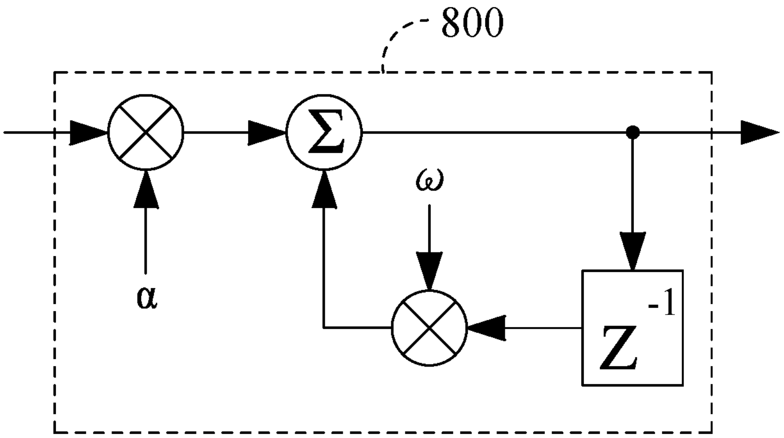
FIG. 8 is a diagram illustrating an example of a dynamic range compression for peak detection.

FIG. 8 illustrates an example of a dynamic range compression for a peak detection approach. In FIG. 8, a filter 800 indicates an alpha filter structure for dynamic range compression, wherein a coefficient alpha a can be set to a value of "a" and a parameter omega ω can then be set to a value of 1 minus "a". According to conventional applications of the alpha filter structure for smoothing a signal or varying data, the peak detector 141 can be implemented using the filter 800 for peak hold time control so as to smoothly output a peak indication excursion signal Yp(t) (e.g., as illustrated in the middle portion of FIG. 7) according to the estimated excursion signal Y(t).

Figure 9:
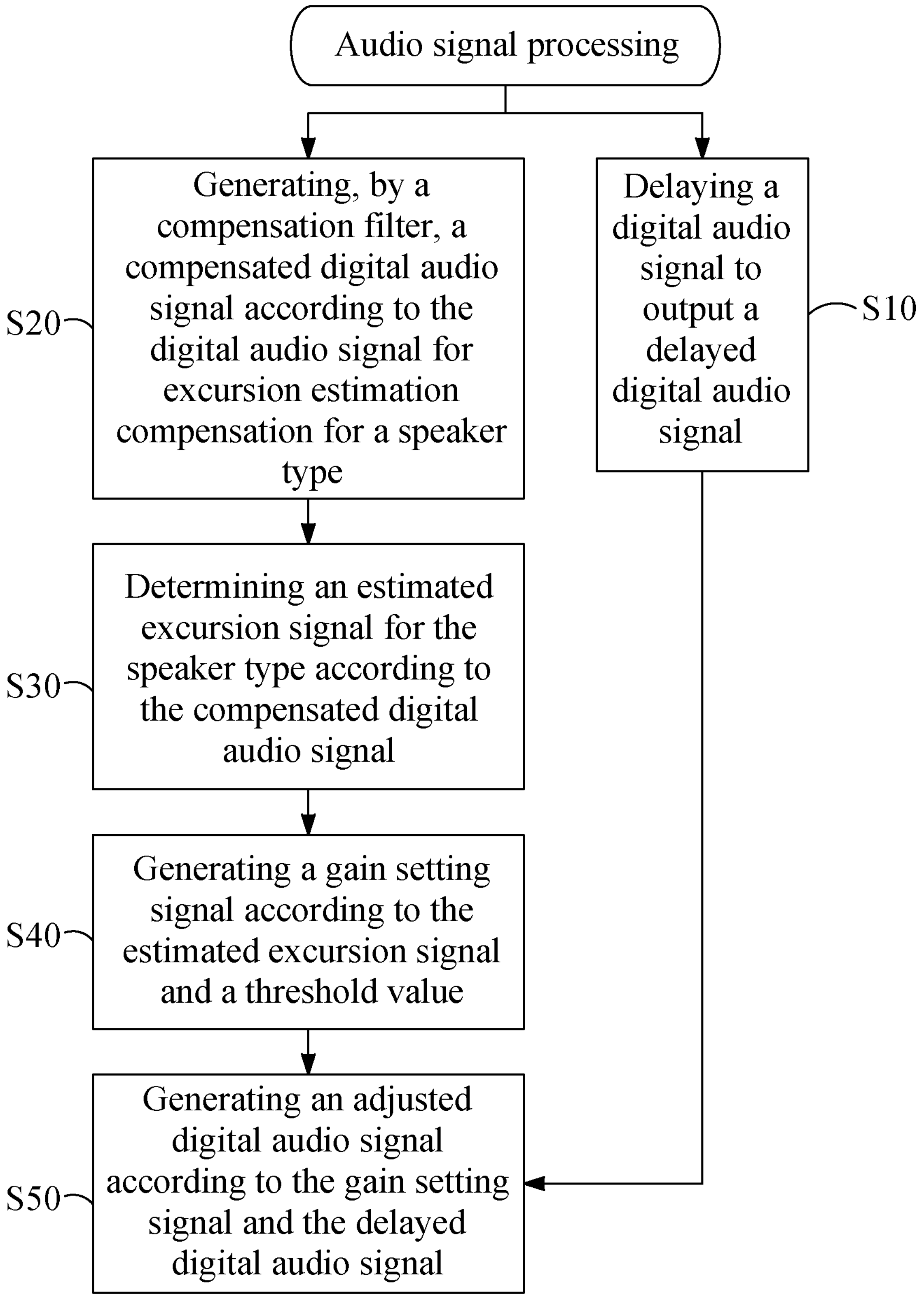
FIG. 9 is a flowchart illustrating a flowchart of a method for audio signal processing with excursion estimation compensation according to an embodiment of the present disclosure.

Further, FIG. 9 illustrates a flowchart of a method for audio signal processing with excursion estimation compensation according to an embodiment of the present disclosure. The method includes following steps S10 to S50.

In step S10, a digital audio signal (e.g., X(t)) is delayed to output a delayed digital audio signal (e.g., Xd(t)).

In step S20, a compensated digital audio signal (e.g., Xc(t)) is generated by a compensation filter (e.g., 120 in FIG. 1 or related examples) according to the digital audio signal (e.g., X(t)) for excursion estimation compensation for a speaker type (e.g., the first or second speaker type, as exemplified above).

In step S30, an estimated excursion signal (e.g., Y(t)) for the speaker type is determined according to the compensated digital audio signal.

In step S40, a gain setting signal (e.g., G(t)) is generated according to the estimated excursion signal and a threshold value, such as an excursion threshold (Xmax).

In step S50, an adjusted digital audio signal (e.g., OUT(t)) is generated according to the gain setting signal (e.g., G(t)) and the delayed digital audio signal (e.g., Xd(t)).

In some embodiments of the method, step S40 may comprise: outputting a peak indication excursion signal according to the estimated excursion signal; and generating the gain setting signal according to the peak indication excursion signal.

In some embodiments of the method in FIG. 9, any one of the above embodiments of the circuit 100 (or 100A) can also be applied or two or more thereof can be combined, whenever appropriate.

In some embodiments of the present disclosure, the architecture of the circuit 100 or 100A, or the excursion estimation path (or both excursion estimation path and the signal path), can be implemented by a programmable circuit, such as digital signal processor (DSP), field programming gate array (FPGA), application specific integrated circuit (ASIC), and so on. In some embodiments of the present disclosure, the excursion estimation path (or both the excursion estimation path and signal path) can be implemented by dedicated circuitry. The circuit 100 or 100A can also be implemented as or inside an integrated circuit, such as an audio signal processor or related audio chip.

The present disclosure further provides a computer program product which comprises multiple instructions. The instructions enable a computing device to execute a method for audio signal processing with excursion estimation compensation, as illustrated in FIG. 9, according to at least one of above embodiments. In an embodiment, the computer program product comprises a storage medium, such as non-transitory storage medium, which stores computer-readable instructions such as program code, wherein the instructions are executed on at least one computing device (for example, an electronic device having computing or digital audio signal or data processing functionality for facilitating audio reproduction, such as mobile phones, tablet computers, notebook computers, desktop computers, multimedia players, digital audio players, or portable wireless or wired speakers), such that the at least one computing device carries out the method according to at least one of the embodiments. The method is illustrated by FIG. 9 and carried out according to any one of the aforesaid embodiments or any combinations thereof. For instance, the program code comprises, for example, one or more programs or program modules, for use in carrying out the method according to steps S10 to S50 of FIG. 9 and in any appropriate sequence. When the computing device executes the program code, the computing device executes the method according to the embodiment illustrated by FIG. 9. The embodiment of the storage medium includes, but is not limited to, optical information storage medium, magnetic information storage medium or memory (such as memory card, firmware, ROM or RAM). For instance, the computing device comprises a communication circuit, processing circuit and storage medium. The processing circuit is electrically coupled to the communication circuit and storage medium. In another instance, the computing device may comprise a programmable circuit, such as digital signal processor (DSP), field programming gate array (FPGA), application specific integrated circuit (ASIC) or so on, configurable to perform the method based on FIG. 9 according to program code.

While the present disclosure has been described by using specific embodiments, numerous modifications and variations could be made thereto by those skilled in the art without departing from the scope and spirit of the present disclosure set forth in the claims.

What is claimed is:

1. A circuit for audio signal processing with excursion estimation compensation, the circuit comprising:

a delay circuit for delaying a digital audio signal to output a delayed digital audio signal; and a compensation filter for generating a compensated digital audio signal according to the digital audio signal for excursion estimation compensation for a speaker type;

an excursion estimator for determining an estimated excursion signal for the speaker type according to the compensated digital audio signal;

a gain determination circuit for generating a gain setting signal according to the estimated excursion signal and a threshold value; and a gain adjustment circuit for generating an adjusted digital audio signal according to the gain setting signal and the delayed digital audio signal.

2. The circuit for audio signal processing according to claim 1, wherein the compensation filter has a filter response for excursion estimation compensation for the speaker type and is configured to generate the compensated digital audio signal according to the digital audio signal and the filter response.

3. The circuit for audio signal processing according to claim 2, wherein the filter response of the compensation filter is associated with a specific frequency band for excursion estimation compensation for the speaker type and the compensation filter is capable of amplifying components of the digital audio signal with respect to the specific frequency band to generate the compensated digital audio signal.

4. The circuit for audio signal processing according to claim 2, wherein the filter response of the compensation filter is associated with a specific frequency band in which the speaker type is operable to have a maximum excursion.

5. The circuit for audio signal processing according to claim 4, wherein the compensation filter is capable of amplifying components of the digital audio signal with respect to the specific frequency band to generate the compensated digital audio signal according to the digital audio signal and the filter response.

6. The circuit for audio signal processing according to claim 1, wherein the compensation filter is based on an infinite impulse response (IIR) filter or a finite impulse response (FIR) filter.

7. The circuit for audio signal processing according to claim 1, wherein the compensation filter is based on a shelving filter for excursion estimation compensation for a speaker type having a shelving response.

8. The circuit for audio signal processing according to claim 1, wherein the compensation filter is based on a peaking filter for excursion estimation compensation for a speaker type having a peaking response.

9. The circuit for audio signal processing according to claim 1, wherein the gain determination circuit comprises:

a peak detector for outputting a peak indication excursion signal according to the estimated excursion signal; and a gain calculation circuit for generating the gain setting signal according to the peak indication excursion signal and the threshold value.

10. A method for audio signal processing with excursion estimation compensation, the method comprising:

delaying a digital audio signal to output a delayed digital audio signal;

generating, by a compensation filter, a compensated digital audio signal according to the digital audio signal for excursion estimation compensation for a speaker type;

determining an estimated excursion signal for the speaker type according to the compensated digital audio signal;

generating a gain setting signal according to the estimated excursion signal and a threshold value; and generating an adjusted digital audio signal according to the gain setting signal and the delayed digital audio signal.

11. The method according to claim 10, wherein the compensation filter has a filter response for excursion estimation compensation for the speaker type and is configured to generate the compensated digital audio signal according to the digital audio signal and the filter response.

12. The method according to claim 11, wherein the filter response of the compensation filter is associated with a specific frequency band for excursion estimation compensation for the speaker type and the compensation filter is capable of amplifying components of the digital audio signal with respect to the specific frequency band to generate the compensated digital audio signal.

13. The method according to claim 11, wherein the filter response of the compensation filter is associated with a specific frequency band in which a speaker of the speaker type is operable to have a maximum excursion.

14. The method according to claim 13, wherein the compensation filter is capable of amplifying components of the digital audio signal with respect to the specific frequency band to generate the compensated digital audio signal according to the digital audio signal and the filter response.

15. The method according to claim 10, wherein the compensation filter is based on an infinite impulse response (IIR) filter or a finite impulse response (FIR) filter.

16. The method according to claim 10, wherein the compensation filter is based on a shelving filter for excursion estimation compensation for a speaker type having a shelving response.

17. The method according to claim 10, wherein the compensation filter is based on a peaking filter for excursion estimation compensation for a speaker type having a peaking response.

18. The method according to claim 10, wherein generating the gain setting signal according to the estimated excursion signal and a threshold value comprises:

outputting a peak indication excursion signal according to the estimated excursion signal; and generating the gain setting signal according to the peak indication excursion signal.

19. A non-transitory storage medium storing instructions, the instructions enabling a computing device to execute the method of claim 10.

* * * * *